United States Patent [19]

Chapman

[11] Patent Number: 5,236,880
[45] Date of Patent: Aug. 17, 1993

[54] CATALYST FOR CRACKING OF PARAFFINIC FEEDSTOCKS

[75] Inventor: David M. Chapman, Ellicott City, Md.

[73] Assignee: W. R. Grace & Co. -Conn., New York, N.Y.

[21] Appl. No.: 846,989

[22] Filed: Mar. 9, 1992

Related U.S. Application Data

[63] Continuation of Ser. No. 449,656, Dec. 11, 1989, abandoned.

[51] Int. Cl.$^5$ .............................................. B01J 29/34
[52] U.S. Cl. ......................................... 502/74; 502/66; 502/85
[58] Field of Search ............................ 502/66, 74, 85

[56] References Cited

U.S. PATENT DOCUMENTS

| | | | |
|---|---|---|---|
| 3,755,145 | 8/1973 | Orkin | 208/111 |
| 3,827,867 | 11/1972 | Heinemann et al. | 48/211 |
| 3,929,672 | 12/1975 | Ward | 502/66 |
| 4,229,282 | 10/1980 | Peters et al. | 208/111 |
| 4,247,388 | 1/1981 | Banta et al. | 502/77 |
| 4,347,394 | 8/1982 | Detz et al. | 585/419 |
| 4,374,296 | 2/1983 | Haag et al. | 502/77 |
| 4,377,503 | 3/1983 | Dessau | 252/455 Z |
| 4,429,176 | 1/1984 | Chester et al. | 585/481 |
| 4,517,396 | 5/1985 | Hoek et al. | 585/481 |
| 4,522,929 | 6/1985 | Chester et al. | 502/77 |
| 4,543,347 | 9/1985 | Heyward et al. | 502/61 |
| 4,551,438 | 11/1985 | Miller | 502/62 |
| 4,559,314 | 12/1985 | Shihabi | 502/71 |
| 4,560,469 | 12/1985 | Hopkins et al. | 208/110 |
| 4,608,450 | 8/1986 | Miller | 208/111 |
| 4,642,176 | 2/1987 | Adams et al. | 208/138 |
| 4,652,360 | 3/1987 | Dessau | 208/138 |
| 4,717,782 | 1/1988 | Garwood et al. | 585/531 |
| 4,740,645 | 4/1988 | Garwood et al. | 585/329 |
| 4,766,265 | 8/1988 | Desmond et al. | 585/415 |
| 4,816,538 | 3/1989 | Abdo | 502/66 |

FOREIGN PATENT DOCUMENTS 63-156889 3/1988 Japan.
1416482 7/1988 U.S.S.R..

*Primary Examiner*—Carl F. Dees
*Attorney, Agent, or Firm*—Edward J. Cabic

[57] ABSTRACT

A zeolite catalyst with improved hydrocarbon conversion comprising a crystalline aluminosilicate having a $SiO_2/Al_2O_3$ ratio greater than 5 and preferably a MFI or MEL zeolite. The zeolite contains a Group VIIIA metal, preferably nickel, and it has been subjected to severe thermal or hydrothermal treatments under controlled conditions of temperature, time or steam partial pressure so as to effect an increase in the relative surface concentrations of Group VIIIA metal and aluminum. The catalyst can be used in a process for the conversion of paraffinic feedstocks to improve paraffin cracking activity, to increase the aromatic fraction in the C5 to C12 gasoline range products, to improve the calculated octane numbers of the C5 to C12 gasoline range product, and/or to improve the yield of the C5 to C12 gasoline range products.

12 Claims, 5 Drawing Sheets

CATALYST FOR CRACKING OF PARAFFINIC FEEDSTOCKS

This is a continuation of application Ser. No. 449,656, filed Dec. 11, 1989, and now abandoned.

BACKGROUND OF THE INVENTION

1. Field of the Invention

This invention relates to novel catalysts which contain Group VIIIA metals and which have been given severe thermal or hydrothermal treatments. The methods to make the catalysts as well as their methods of use are disclosed.

2. Description of the Previously Published Art

The zeolites ZSM-5 and ZSM-11, first described in U.S. Pat. No. 3,702,886 and U.S. Pat. No. 3,709,979, respectively, have been extensively investigated during recent years. These zeolites have more recently been given the designation MFI and MEL zeolites, respectively, in "Chemical Nomenclature, and Formulation of Compositions of Synthetic and Natural Zeolites" IUPAC yellow booklet, 1978. Together, the materials make up the family of the "pentasil" zeolites as discussed in Jacobs, P. A., and Martens, J. A. "Synthesis of High-Silica Aluminosilicate Zeolites" Studies in Surface Science and Catalysis, Vol. 33, Elsevier, New York, NY, 1987, Chapter IV.

There exist numerous patents describing the use of the MFI and MEL zeolites in hydrocarbon cracking reactions in conjunction with other zeolites as described in U.S. Pat. Nos. 3,702,886; 3,894,931; 3,894,933; and 3,894,934. More recently, there has developed an additive technology using especially MFI zeolites for enhancing the octane rating of gasoline. Illustrations of this technology can be found in U.S. Pat. Nos. 4,368,114; 4,309,279; 4,309,280; 4,289,606; and 3,758,403. These patents describe the addition of an octane enhancing additive such as MFI into a FCC process in order to boost the resulting gasoline's rating. The additive MFI cracks the low octane gasoline components such as paraffins to gas, thus removing them from the gasoline mixture. None of these patents recognize the unique ability of nickel to enhance the activity and selectivity of MFI or MEL zeolites in cracking reactions.

There is also technology for the upgrading of naphthas and FCC effluent as described in U.S. Pat. Nos. 3,770,614; 3,894,931; 4,784,745; and 4,806,230. In U.S. Pat. No. 4,806,230, a zinc or gallium containing MFI zeolite is used to upgrade hydrocarbon naphtha; U.S. Pat. No. 4,784,745 and U.S. Pat. No. 3,894,931 describe the improvement in the octane number or volatility of effluent from an FCC unit using MFI and MEL zeolites; and U.S. Pat. No. 3,770,614 describes the use of MFI to enhance the yield of aromatic hydrocarbons from low boiling reformate. None of these patents mention the use of nickel to enhance the activity or selectivity of the crystalline MFI or MEL zeolites.

Nickel containing MFI zeolite has been developed for use in the hydrodewaxing of lubricating oil stock as revealed in U.S. Pat. Nos. 4,642,176; 4,560,649; and 4,229,282. The use of Ni-MFI in the production of middle distillate from light olefins is described in U.S. Pat. No. 4,517,396. The use of Ni-MFI in gas oil hydrocracking, giving gasoline fractions of increased octane number is the object of U.S. Pat. No. 4,816,538. U.S. Pat. No. 3,755,145 claims the use of MFI zeolite in hydrocracking processes also. There has developed technology for the use of Ni-MFI zeolite for the synthesis of aromatic hydrocarbons using acidic forms of MFI zeolite as patented in S. U. 1,416,482; Japanese Patent Publication (unexamined) No. 156,889/1988; U. S. Pat. No. 3,827,867; and U.S. Pat. No. 4,766,265. There has also evolved technology for the production of aromatic hydrocarbons using non-acidic MFI zeolite as described in U. S. Pat. No. 4,652,360 and 4,347,394. These patents for base-exchanged zeolites are not relevant to the present invention, which is only concerned with the activity and selectivity of MFI and MEL zeolites in their acidic forms. The oligomerization of olefin containing feedstocks, particularly ethylene, using Ni-MFI can be found patented in U.S. Pat. Nos. 4,740,645, 4,608,450 and 4,551,438. Finally, the use of Ni-MFI zeolites for the conversion of synthesis gas to hydrocarbons is the subject of U.S. Pat. No. 4,543,347, and for shape selective reactions is described in U.S. Pat. No. 4,377,503. None of the above patented technology, however, recognizes the advantages of severe hydrothermal treatment of Ni-MFI and Ni-MEL zeolites in the particular reactions relevant to each patent.

U.S. Pat. No. 4,717,782, assigned to Mobil Oil, discloses using a nickel containing ZSM-5 catalyst to oligomerize ethene in the presence of a reducing component such as hydrogen and a co-feed of water. The water is present in an amount to maintain the nickel component of the oligomerization catalyst in an oxidized state. Once the water co-feed is terminated, the Ni-ZSM-5 catalyst looses its selectivity advantages. The gas stream containing ethene in the presence of hydrogen is converted into liquid hydrocarbons. The presence of water under the mild reaction conditions described does not convert the Ni-MFI permanently into the unique zeolite as described herein.

Mild steaming of shape-selective zeolites has been disclosed by Chester et al. in U.S. Pat. Nos. 4,429,176 and 4,522,929 as enhancing both the alpha activity and stability of such catalysts in acid-catalyzed reactions such as xylene isomerization. U.S. Pat. No. 4,559,314 to Shihabi teaches that very highly siliceous shape-selective zeolites, which are inactive, can be activated by steaming the alumina bound zeolite. These patents, however, do not recognize the combined effect of hydrothermal treatment with added nickel on the catalytic activity and selectivity in hydrocarbon reactions.

3. Objects of the Invention

It is an object of this invention to prepare a novel catalyst with improved activity and selectivity characteristics after severe thermal or hydrothermal pretreatments in catalytic reactions.

It is a further object of this invention to prepare a catalyst with improved activity and selectivity after severe thermal and hydrothermal treatments for processes involving the cracking of paraffinic hydrocarbons, such as may occur in refinery effluents.

It is a further object of this invention to prepare a catalyst with improved selectivity to aromatic hydrocarbons in processes involving the cracking of paraffinic hydrocarbons.

It is a further object of this invention to prepare a catalyst which produces improved research and motor octane number product in processes involving the cracking of paraffinic hydrocarbons.

It is a further object of this invention to prepare a catalyst which produces greater gasoline yield in processes involving the cracking of paraffinic hydrocarbons.

It is a further object of this invention to prepare a catalyst that shifts to higher average molecular weight the hydrocarbon products produced in processes involving the cracking of paraffinic hydrocarbons.

These and further objects will become apparent as the invention proceeds.

SUMMARY OF THE INVENTION

This invention provides a catalyst with improved activity and selectivity, where the improvement comprises forming a unique Group VIIIA metal (preferably nickel) containing crystalline aluminosilicate (preferably a MFI and MEL zeolite having a $SiO_2/Al_2O_3$ ratio greater than 5) by a severe thermal and hydrothermal treatment of the Group VIIIA promoted zeolite under controlled conditions of temperature, time, or steam partial pressure. These unique zeolite materials are characterized by enrichment of the Group VIIIA metal (preferably nickel) and aluminum elemental concentrations on the surface of the zeolite relative to the average bulk Group VIIIA and aluminum concentrations. These unique zeolite materials in the case of using nickel are also characterized by the transformation of a nickel phase that has x-ray photoelectron spectroscopic (XPS) features similar to those of nickel oxide to a nickel phase that has XPS features similar to those of nickel aluminate. These unique zeolite materials are also characterized by variations in their catalytic activity and selectivity in the cracking of paraffinic hydrocarbons. These transformations of the nickel containing MFI and MEL zeolites are caused by severe thermal and hydrothermal treatments.

This invention also relates to the improvement in the aromatic content and research and motor octane numbers of the product produced in processes involving the cracking of paraffinic hydrocarbons. The unique materials described in this invention also improve the gasoline yield and produce a shift to higher average molecular weight of the products produced in the cracking of paraffinic hydrocarbons.

Thus, the present invention relates to the superior activity and selectivity in the cracking of paraffinic hydrocarbons which result from severe thermal and hydrothermal treatment of preferably nickel containing MFI or MEL zeolites relative to the MFI and MEL zeolite or mildly pretreated Ni-MFI and Ni-MEL zeolites. The paraffinic feedstocks are converted to improve the paraffin cracking activity, to increase the aromatic fraction in the C5 to C12 gasoline range products, to improve the calculated octane numbers of the C5 to C12 gasoline range products and/or to improve the yield of the C5 to C12 gasoline range products.

DETAILED DESCRIPTION OF THE INVENTION

The term zeolite as used herein refers to microporous structures of silicates or aluminosilicates. The zeolites have crystalline, hydrated frameworks, based on a three dimensional network of $SiO_4$ tetrahedra possibly with $AlO_4$ tetrahedra, wherein the tetrahadra are linked to each other by the sharing of oxygens. Exemplary of these materials are zeolite MFI and zeolite MEL.

Zeolites are best characterized according to framework structure type, i.e., on the topology of the framework, irrespective of composition, distribution of different tetrahedral atoms, cell dimensions and symmetry. A code consisting of three capital letters has been adopted for each known structure type following the recommendations by IUPAC on zeolite nomenclature ("Chemical Nomenclature, and Formulation of Compositions of Synthetic and Natural Zeolites" IUPAC yellow booklet, 1978) and a compilation of 38 known zeolite structure types has been published by The Structure Commission of the International Zeolite Association as the "Atlas of Zeolite Structure Types" by Meier, W. and Olson, D. H. (1978). The structure types that are pertinent to the present invention are the MFI and MEL structures.

The $SiO_2/Al_2O_3$ molar ratio of the zeolites of the present invention is in the range of about 5:1 to about 500:1, preferably ranging from about 20:1 to about 100:1. The as-synthesized zeolite can contain organic and/or alkali metal cations which are removed prior to catalytic use. The organic cations can be effectively removed during a calcination of the zeolite, at a temperature of between about 300° C. and 700° C., preferably between about 400° C. and 600° C., for a period of from about 1 hour to about a few days. The alkali metal cations can be effectively removed by ion exchange, such as by treatment of the zeolite with a strong acid, and/or by ion exchange with other cations such as ammonium cations. In one embodiment, the zeolite in the as-synthesized form is exchanged with ammonium ions, calcined at 550° C. in air for 1 hour, followed by a second ammonium ion exchange. These treatments replace the extraframework cations with ammonium cations. The ammonium form of the zeolite can then be calcined to generate the acid form of the zeolite.

The zeolite, usually in its ammonium ($NH_4$) or the acid (H) form is given a treatment with a source of a Group VIIIA metal. These metals include iron, cobalt, nickel, ruthenium, rhodium, palladium, osmium, iridium and platinum with the preferred metal being nickel. The term "treatment" refers to ion exchange, impregnation or any other known method of incorporating the preferred nickel into the zeolite. The preferred method of metal incorporation uses, but is not limited to, water soluble nickel salts with Ni in the 2+ valence state such as $Ni(NO_3)_2$ or $NiCl_2$. The nickel on the zeolite may be present in an amount from about 0.1 wt % Ni to about 10 wt % Ni of the total weight of the zeolite. The preferred metal content of the zeolite is from about 0.3 wt % to about 5 wt %.

A binder may be added to aid in fabricating the molecular sieve catalyst into a suitable form. Binder materials which may be used include clays, alumina, silica, aluminophosphate and other suitable oxide materials. The finished catalyst may contain binder amounts of between zero and about 90% by weight, more preferably between about 10% and about 50% by weight. The preferred binder material is silica, which can be incorporated in colloidal form from materials such as Ludox AS-40, available from DuPont. Silica has been found not to interfere with catalyst activity and additionally does not promote side reactions, such as coking.

Once the zeolite is in its ammonium or protic form and contains nickel, and either before or after the zeolite is bound into a formulated catalyst with a binder material, the zeolite is activated with a thermal or hydrothermal treatment. The thermal or hydrothermal treatment may also be carried out as part of a regeneration procedure on a catalyst which has been partially or wholly deactivated in use.

The thermal treatment in any of the above embodiments is suitably carried out by heating the material in any suitable atmosphere such as an inert gas or air. The thermal treatment should be carried out at temperatures of between about 500° C. and 1000° C., preferably between about 650° C. and 800° C., for periods of time ranging from about 0.5 hours to a few days, preferably about 1 hour. It has been found in the present invention that the more severe thermal treatments are desirable to cause the transformation of the nickel containing zeolite to its more desirable form. It is theorized, without being bound by the theory, that the severe thermal treatment causes migration of nickel and aluminum species to the surface of the zeolite crystal and serves to react the nickel with aluminum to form highly dispersed nickel aluminate in the zeolite crystals. Increasing the severity of one or more relevant parameters may allow reduction of the severity of other relevant parameters. For instance, raising the thermal treatment temperature can be expected to shorten the duration of the treatment needed to improve the catalytic selectivity of the zeolite.

The hydrothermal treatment in any of the above embodiments is suitably carried out by heating the material in an atmosphere containing steam as such or a carrier gas stream comprising steam. The carrier gas stream used for steam treatment suitably contains a partial pressure of steam from about 1% to about 100%. The carrier gas stream may contain air, nitrogen or any other inert gas. The hydrothermal treatment is suitably carried out at a pressure of between 0.01 and 1.0 MPa, preferably at about 0.1 MPa, and a temperature between about 400° C. and 900° C., preferably between about 550° and 800° C. The hydrothermal treatment should be carried out for periods of time ranging from about 0.5 hours to a few days, preferably about 1 hour to about 8 hours. It has been found in the present invention that the more severe hydrothermal treatments are desirable to maximize the desirable characteristics of the nickel containing zeolite. Increasing the severity of one or more relevant parameters may allow reduction of the severity of other relevant parameters. For instance, raising the hydrothermal treatment temperature can be expected to shorten the duration of the treatment needed to improve the catalytic selectivity of the zeolite.

The process of the present invention relates to the conversion of paraffinic hydrocarbons to lower boiling products such as in cracking reactions. Suitable paraffinic reactants include C6 to C16 hydrocarbons, which may occur in large concentrations in refinery effluents from reforming or hydrocracking reactors. The conversion of the paraffinic reactants is accomplished by contacting the paraffinic feedstock with a catalyst prepared according to the present invention. Non-deleterious components, such as inert gases or hydrogen, may also be present. The temperature of the reactor for the hydrocarbon conversion ranges from about 400° C. to about 800° C., and the pressure of the reaction is from about 0.01 MPa to 1 MPa.

Having described the basic aspects or our invention, the following examples are given to illustrate specific embodiments thereof.

EXAMPLE 1

This example describes the preparation of an MFI-type zeolite.

An MFI-type zeolite was crystallized according to Jacobs, P.A., and Martens, J.A. "Synthesis of High-Silica Aluminosilicate Zeolites" *Studies in Surface Science and Catalysis, Vol.* 33, Elsevier, New York, NY, 1987, pg. 47. Chemical analysis of the product showed that on an anhydrous basis the product contained 2.39 wt % $Na_2O$, 3.7 wt % $Al_2O_3$ and 93.7 wt % $SiO_2$. The crystallite size averaged about 0.2 micron. The surface area was 405 $m^2/gm$. A 200 gm portion of this crystalline product was slurried in 2 L of 1N $NH_4NO_3$ solution and heated at 80° C. for 1 hour. The product was filtered and washed with deionized water. It was then ramped in air at 2° C./min to 550° C. and held for 1 hour. The sample was cooled slowly to ambient temperature and was then slurried again in 2 L of 1N $NH_4NO_3$ and heated at 80° C. for 1 hour. The product was filtered and washed with deionized water and dried at 100° C. overnight. Chemical analyses of the product showed that the $Na_2O$ level was 0.025 wt %, on an anhydrous basis.

EXAMPLE 2

This example describes the preparation of a Ni-MFI zeolite used in subsequent examples.

Thirty two gms, on an anhydrous basis, of the product of Example 1 was impregnated with a solution consisting of 3.90 gms $Ni(NO_3)_2.6H_2O$ in 28 ml water. The product was dried at 100° C., and then ramped in air at 2° C./min to 400° C., and was held at that temperature for 1 hour. It was then cooled slowly to ambient temperature. The product contained 0.025% $Na_2O$ and 2.27% Ni on an anhydrous basis.

EXAMPLE 3

This example describes the preparation of a catalytically active Ni-MFI zeolite thermally treated at 550° C. in air.

Six gms of the product from Example 2 was ramped in air at 2° C./min to 550° C., and was held at that temperature for 1 hour. It was then cooled slowly to ambient temperature.

COMPARISON EXAMPLE 3

This example describes the preparation of a catalytically active MFI zeolite thermally treated at 550° C. in air.

Six gms of the product from Example 1 was ramped in air at 2° C./min to 550° C., and was held at that temperature for 1 hour. It was then cooled slowly to ambient temperature.

EXAMPLE 4

This example describes the preparation of a catalytically active Ni-MFI zeolite thermally treated at 650° C. in air.

Six gms of the product from Example 2 was ramped in air at 2° C./min to 650° C., and was held at that temperature for 1 hour. It was then cooled slowly to ambient temperature.

EXAMPLE 5

This example describes the preparation of a catalytically active Ni-MFI zeolite thermally treated at 750° C. in air.

Six gms of the product from Example 2 was ramped in air at 2° C./min to 750° C., and was held at that temperature for 1 hour. It was then cooled slowly to ambient temperature.

COMPARISON EXAMPLE 5

This example describes the preparation of a catalytically active MFI zeolite thermally treated at 750° C. in air.

Six gms of the product from Example 1 was ramped in air at 2° C./min to 750° C., and was held at that temperature for 1 hour. It was then cooled slowly to ambient temperature.

EXAMPLE 6

This example describes the preparation of a catalytically active Ni-MFI zeolite hydrothermally treated at 550° C. in air.

Six gms of the product from Example 2 was meshed −14 +25, and was then ramped under flowing nitrogen to 550° C. over the period of 1 hour. It was held at that temperature for 4 hours while a mixture of 95% water/5% nitrogen was passed over the zeolite at atmospheric pressure. The product was then cooled slowly to ambient temperature.

COMPARISON EXAMPLE 6

This example describes the preparation of a catalytically active MFI zeolite hydrothermally treated at 550° C.

Six gms of the product from Example 1 was meshed −14 +25, and was then ramped under flowing nitrogen to 550° C. over the period of 1 hour. It was held at that temperature for 4 hours while a mixture of 95% water/5% nitrogen was passed over the zeolite at atmospheric pressure. The product was then cooled slowly to ambient temperature.

EXAMPLE 7

This example describes the preparation of a catalytically active Ni-MFI zeolite hydrothermally treated at 750° C.

Six gms of the product from Example 2 was meshed −14 +25, and was then ramped under flowing nitrogen to 750° C. over the period of 1 hour. It was held at that temperature for 4 hours while a mixture of 95% water/5% nitrogen was passed over the zeolite at atmospheric pressure. The product was then cooled slowly to ambient temperature.

COMPARISON EXAMPLE 7

This example describes the preparation of a catalytically active MFI zeolite hydrothermally treated at 750° C.

Six gms of the product from Example 1 was meshed −14 +25, and was then ramped under flowing nitrogen to 750° C. over the period of 1 hour. It was held at that temperature for 4 hours while a mixture of 95% water/5% nitrogen was passed over the zeolite at atmospheric pressure. The product was then cooled slowly to ambient temperature.

It can be seen from the above discussion that samples from Examples 2, 3, 4, 5, 6 and 7 differ in the nature of the pretreatment conditions, with samples from Examples 2, 3, 4 and 5 being subjected to thermal treatments of varying severity and samples from Examples 6 and 7 being subjected to hydrothermal treatments of varying severity.

EXAMPLE 8

This example describes he preparation of $NiAl_2O_4$. Stoichiometric amounts of $Al(NO_3)_3.9H_2O$ and $Ni(NO_3)_2.6H_2O$ were weighed out and ground together thoroughly. The mixture of powders was then calcined in air at 1000° C. for 24 hours. The product was then re-ground thoroughly and fired again at 1000° C. for 24 hours. X-ray powder diffraction of the product revealed it to be crystalline $NiAl_2O_4$.

EXAMPLE 9

This example describes the preparation of NiO. $Ni(NO_3)_2.6H_2O$ was fired at 1000° C. for 24 hours. X-ray powder diffraction analysis revealed the product to be crystalline NiO.

EXAMPLE 10

This example describes the characterization of the novel Ni-ZSM-5 phases using x-ray photoelectron spectroscopy (XPS). The binding energies and surface atomic concentrations of the Ni $2p_{3/2}$, Al 2p and Si 2p spectral signatures were determined for various thermally and hydrothermally treated MFI and Ni-MFI samples. Photoelectron spectra were obtained on a Perkin Elmer ESCA 5400 Spectrophotometer using 300 Watt Mg K radiation and standard procedures familiar to those versed in the art. The binding energies were referenced either to the Au $4f_{7/2}$ band at 84.0 eV obtained by sputtering Au on to the zeolite samples, or to the C 1s band at 284.6 eV obtained from carbon impurities deposited on the samples. Surface atomic concentrations were measured in duplicate, with the average values reported in Table 1.

TABLE 1

| Sample | Example # | Pretreatment (°C.) | Bulk Atomic Ratios | | | Surface Atomic Ratios | | | $Ni2p_{3/2}$ Binding Energy (eV) |
|---|---|---|---|---|---|---|---|---|---|
| | | | Si/Al | Al/Ni | Si/Ni | Si/Al | Al/Ni | Si/Ni | |
| Ni-MFI | 3 | Calc. 550° | 22 | 1.9 | 40 | 30 | 2.3 | 68 | 854.3 |
| Ni-MFI | 4 | Calc. 650° | 22 | 1.9 | 40 | 29 | 2.2 | 62 | 854.2 |
| Ni-MFI | 5 | Calc. 750° | 22 | 1.9 | 40 | 29 | 2.0 | 58 | 854.4 |
| Ni-MFI | 6 | Stm. 550° | 22 | 1.9 | 40 | 19 | 1.6 | 31 | 857.3 |
| Ni-MFI | 7 | Stm. 750° | 22 | 1.9 | 40 | 7.4 | 2.3 | 22 | 857.2 |

TABLE 1-continued

| Sample | Example # | Pretreatment (°C.) | Bulk Atomic Ratios | | | Surface Atomic Ratios | | | Ni2p$_{3/2}$ Binding Energy (eV) |
|---|---|---|---|---|---|---|---|---|---|
| | | | Si/Al | Al/Ni | Si/Ni | Si/Al | Al/Ni | Si/Ni | |
| NiAl$_2$O$_4$ | 8 | — | | — | | | — | | 856.6 |
| NiO | 9 | — | | — | | | — | | 853.5 |

As is well known to those versed in the art, the method of XPS is sensitive only to roughly the first 50 Angstrom units of the samples and thus only measures surface concentrations of elements.

Figure 1:
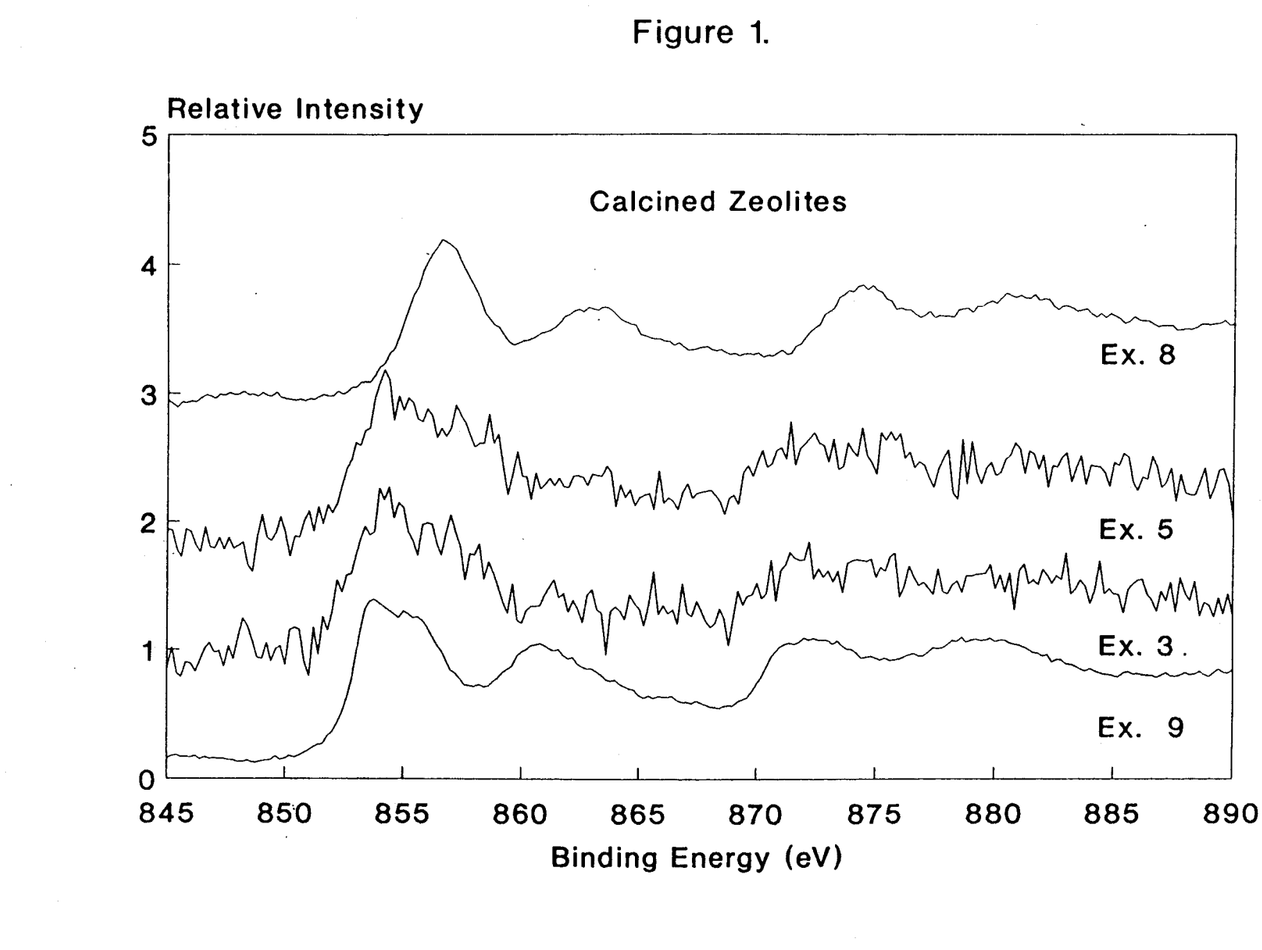
FIG. 1 is a graph of the Ni 2p X-ray photoelectron spectra for materials from Examples 3, 5, 8 and 9.

The bulk and surface elemental ratios and Ni 2p$_{3/2}$ (abbreviated Ni 2p) binding energies determined by XPS for various Examples are given in Table 1. Data for samples from Examples 2 through 5, which were calcined in air, show that the surface silicon/aluminum ratio does not change with the severity of the thermal treatment. However, small decreases in the Al/Ni and Si/Ni surface atomic ratios indicate that some of the nickel migrates to the surface of the zeolite crystals, with the extent of migration correlating to the severity of the thermal pretreatment. The binding energy of the predominant Ni 2p feature of the zeolites does not vary, however, with the severity of the thermal treatment, and is similar to the binding energy of the Ni 2p band of NiO. XPS spectra of samples from Examples 3, 4, 8 and 9 are shown in FIG. 1. It can be seen that the predominant Ni 2p bands for the calcined zeolite samples have line shapes and binding energies which are similar to the line shape and binding energy of the Ni 2p band of NiO, and are decidedly different from the line shape and binding energy of the Ni 2p band of NiAl$_2$O$_4$. Furthermore, it can be seen in FIG. 1 and Table 1 that the line shapes and binding energies of the zeolite samples do not change dramatically with the severity of the thermal treatments.

XPS data from samples prepared according to Examples 6 and 7, given also in Table 1, show that after hydrothermal treatment the surface Si/Al ratio is much smaller than that prior to hydrothermal treatment. This finding is consistent with the migration of Al ions from lattice positions to the surface of the zeolite crystals. Furthermore, the surface Si/Ni ratio for samples from Examples 6 and 7 is also much lower than for the samples with only a thermal treatment. This finding is consistent with a migration of Ni ions to the surface of the zeolite crystals which accompanies the migration of Al. The extent of nickel and aluminum migration correlates with the severity of the hydrothermal pretreatment.

Figure 2:
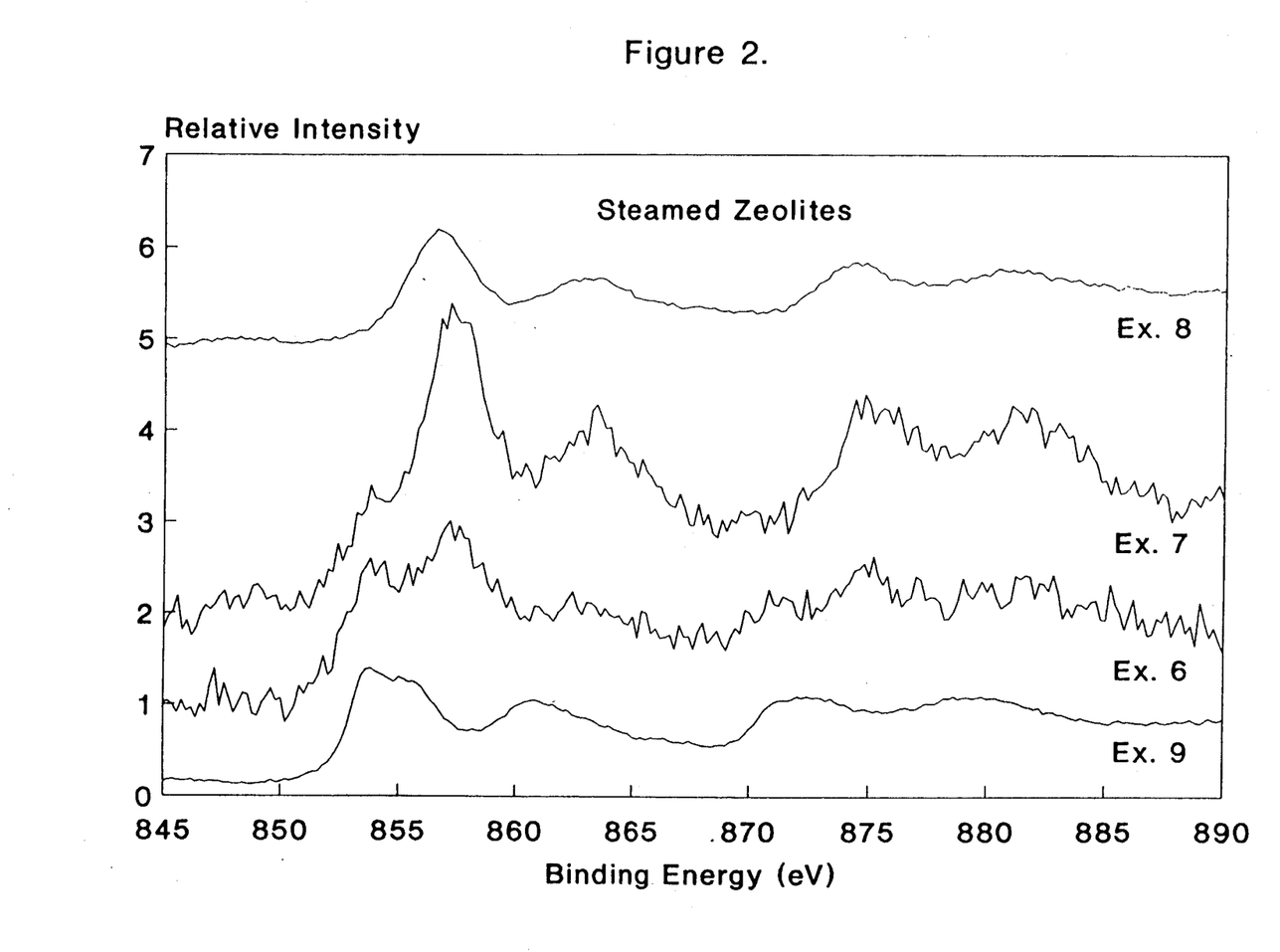
FIG. 2 is a graph of the Ni 2p X-ray photoelectron spectra for materials from Examples 6, 7, 8 and 9.

It can also be seen in Table 1 that there is a +3 eV shift in the binding energy of the predominant Ni 2p band from about 854.3 eV to about 857.3 eV for the steamed samples compared to the calcined samples. The latter binding energy is more characteristic of Ni in the form of NiAl$_2$O$_4$ than Ni in the form of NiO. In FIG. 2 can be seen the XPS spectra of the Ni 2p band for the zeolite samples from Examples 6 and 7, and samples from Examples 8 and 9.

It is clear from comparison of samples from Examples 6 and 7 in FIG. 2 to samples from Examples 3 and 5 shown in FIG. 1 that there is a dramatic change in the line shape of the predominant Ni 2p feature associated with the hydrothermal treatment. After the hydrothermal treatments, the predominant Ni 2p feature in the zeolites resembles that for NiAl$_2$O$_4$ rather than that for NiO. Thus, for thermal treatments ranging from 550° C. to 750° C., there is some migration of Ni and essentially no migration of Al to the zeolite crystal surface and the predominant Ni 2p feature has a binding energy and line shape similar to those of NiO. However, after hydrothermal treatments ranging from 550° C. to 750° C., there is a dramatic migration of both Al and Ni to the zeolite crystal surfaces and the predominant Ni 2p band for the zeolites has a binding energy and line shape similar to those of NiAl$_2$O$_4$. These observations demonstrate that hydrothermal treatment of nickel and aluminum containing MFI zeolites results in the synthesis of novel zeolite materials containing gradients in the elemental distribution across the zeolite crystals and transformed nickel features, that cannot be obtained to appreciable extents by simple thermal treatments over the above prescribed range.

The XPS spectrum of the sample from Example 6 (FIG. 2) shows Ni 2p features characteristic of the Ni 2p features of both the NiO phase and the NiAl$_2$O$_4$ phase. In addition, the surface atomic ratios given in Table 1 show monotonic variations with the severity of the thermal and hydrothermal treatments. These data demonstrate that over the range of experimental pretreatment severities examined a gradual transformation of the zeolite occurs. Thus, the sample from Example 3 represents one end-member of the series for which the nickel and aluminum are distributed reasonably well throughout the zeolite crystals and the Ni 2p feature resembles that for NiO, while the sample from Example 7 represents another end-member of the series for which the nickel and aluminum have migrated to the surface of the zeolite crystals and the Ni 2p feature resembles that for NiAl$_2$O$_4$. Therefore, the samples from Examples 4, 5 and 6 represent intermediate extents of transformation where one Ni 2p feature predominates, but where the other Ni 2p feature is present at a much lower concentration. Because of the poor signal/noise ratios for the XPS spectra in FIGS. 1 and 2, it was not possible to deconvolute the spectra to obtain a quantitative measure of the amount of the NiO-like phase relative to the amount of NiAl$_2$O$_4$-like phase. Therefore, the materials were evaluated as described in Example 11 to provide another measure of the uniqueness of the hydrothermally treated Ni-MFI zeolite phase.

EXAMPLE 11

This example describes the comparison testing of the Ni-MFI samples using the cracking reaction of n-tetradecane.

Portions of 0.005 gm to 0.5 gm quantities of zeolite catalyst were pelleted and sieved to −40+80 mesh, diluted to a final volume of 2 cc with alundum (alumina), and were heated to 500° C. in a stainless steel reactor tube (i.d. 6 mm) that was connected to an automated Chem Data Systems Model 900 Micro-Scale Bench-Top Reaction System. N-tetradecane was passed at a rate of 4.58 gms/hr through the catalyst bed with a carrier flow of 20 cc/min at 500° C. and atmospheric pressure. Products from the reaction were analysed after 90 seconds on stream using an on-line HP 5890 Gas Chromatograph equipped with an HP PONA capillary column. Carbonaceous deposits left on the catalyst after reaction were measured separately using a Perkin Elmer 2400 CHN Elemental Analyzer. Interpolated data at 55% conversion obtained on samples from Examples 3, 5, 6 and 7 are listed in Table 2.

TABLE 2

Tetradecane Cracking Reaction Results at 55% Conversion

| Sample | Ni-MFI | | | | |
|---|---|---|---|---|---|
| Example # | 3 | 4 | 5 | 6 | 7 |
| Pretreatment | Calc. 550° | Calc. 650° | Calc. 750° | Stm. 550° | Stm. 750° |
| Loading, gms | 0.008 | 0.008 | 0.011 | 0.013 | 0.110 |
| WHSV, hr$^{-1}$ | 572 | 572 | 416 | 352 | 42 |
| Composition, wt. % in C5–C12 Fraction | | | | | |
| n-Paraffins | 30.5 | 29.0 | 22.3 | 21.7 | 17.0 |
| i-Paraffins | 2.1 | 2.1 | 2.0 | 2.0 | 2.0 |
| Product Yields wt. % | | | | | |
| n-C$_4$H$_{10}$ | 1.85 | 1.87 | 1.35 | 1.20 | 0.73 |
| i-C$_4$H$_{10}$ | 0.41 | 0.43 | 0.30 | 0.27 | 0.14 |
| n-C$_5$H$_{10}$ | 1.26 | 1.22 | 0.90 | 0.83 | 0.49 |
| i-C$_5$H$_{10}$ | 0.20 | 0.19 | 0.16 | 0.14 | 0.10 |
| Calculated Octane For C5–C12 Gasoline | | | | | |
| RON | 83.0 | 84.3 | 88.9 | 89.3 | 90.3 |
| MON | 71.6 | 72.5 | 75.4 | 75.9 | 76.1 |
| C4 Paraffin/Olefin | 0.22 | 0.22 | 0.13 | 0.12 | 0.07 |
| C5 Paraffin/Olefin | 0.29 | 0.26 | 0.16 | 0.16 | 0.08 |

As can be seen in Table 2, the pretreatment conditions have a distinct influence on the distributions of hydrocarbon products observed in the tetradecane cracking reaction when compared at constant conversion. An increase in the thermal pretreatment temperature from 550° C. to 750° C. results in a decrease in the paraffin content of the gasoline range product as well as in the yields of C4 and C5 paraffins. Under these preferred conditions, the cracking of tetradecane at 500° C., atmospheric pressure and 55% conversion produces an n-paraffin selectivity in the C5-C12 fraction of the products which is less than 29 wt. %. Furthermore, the C4 and C5 paraffin/olefin ratios decrease with increasing thermal pretreatment temperature, while the calculated research and motor octane numbers of the gasoline range product increase.

Similar trends are observed for the hydrothermally treated samples. An increase in the hydrothermal pretreatment temperature from 550° C. to 750° C. results in a decrease in the paraffin content of the gasoline range product as well as in the yields of C4 and C5 paraffins. Furthermore, the C4 and C5 paraffin/olefin ratios decrease with increasing hydrothermal pretreatment temperature, while the calculated research and motor octane numbers of the gasoline range product increase.

Figure 3:
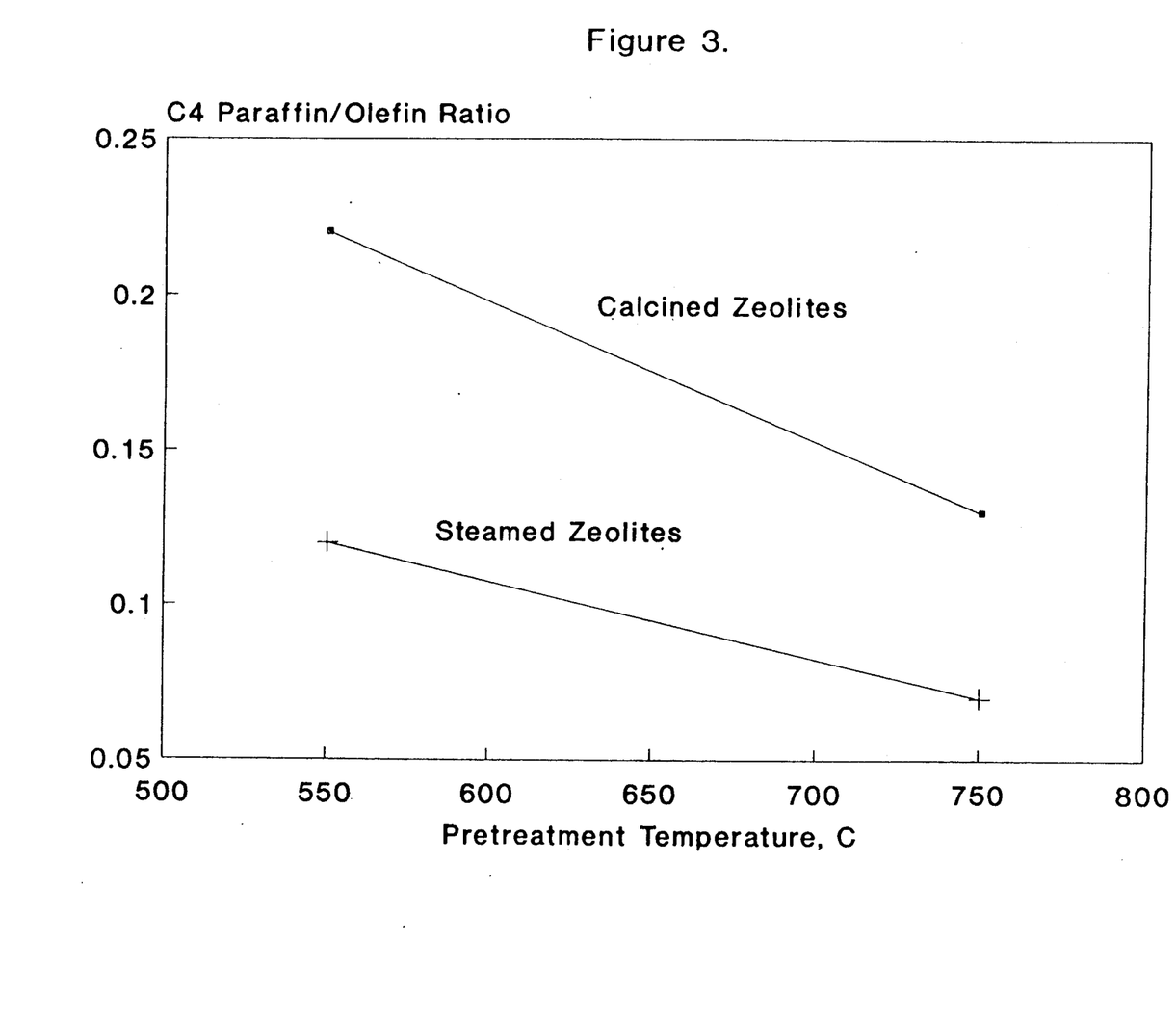
FIG. 3 is a plot of the C4 paraffin/olefin ratio as a function of pretreatment temperature for calcined zeolites from Examples 3 and 5 and for steamed zeolites from Examples 6 and 7 determined by n-tetradecane cracking at 500° C. and 55% conversion.
Figure 4:
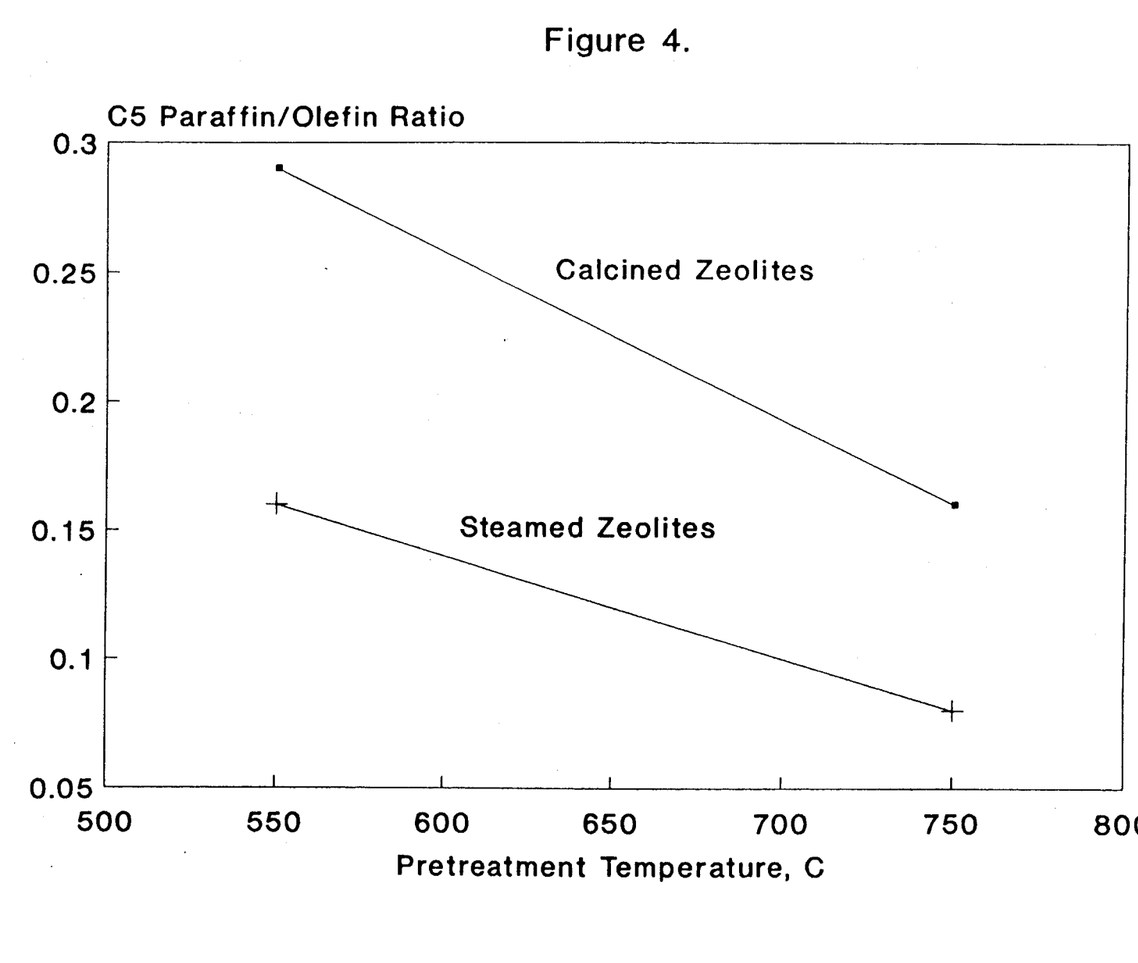
FIG. 4 is a plot of the C5 paraffin/olefin ratio as a function of pretreatment temperature for calcined zeolites from Examples 3 and 5 and for steamed zeolites from Examples 6 and 7 determined by n-tetradecane cracking at 500° C. and 55% conversion.

Shown in FIGS. 3 and 4 are the paraffin/olefin ratios plotted against the temperature of the pretreatment. For the sample from Example 3 which was thermally treated at 550° C. and which revealed a predominant surface phase resembling NiO, the C4 and C5 paraffin/olefin ratios are 0.22 and 0.29, respectively. For the sample from Example 7 which was hydrothermally treated at 750° C. and which revealed a predominant surface phase resembling NiAl$_2$O$_4$, the C4 and C5 paraffin/olefin ratios are 0.07 and 0.08, respectively. The samples from Examples 5 and 6, which were thermally treated at 750° C. and hydrothermally treated at 550° C., respectively, displayed paraffin/olefin ratios that were intermediate to these end-members. It can be seen in FIGS. 1 and 2 that samples from Examples 5 and 6 contained both of the NiO-like surface phase and the NiAl$_2$O$_4$-like phase, and hence these samples are also shown by the XPS studies to be intermediate to the end-members of Examples 3 and 7. Thus, the variation in the C4 and C5 paraffin/olefin ratios, the paraffin selectivity in the gasoline fraction and the calculated octane numbers correlate with the transformation of the NiO-like surface phase to the NiAl$_2$O$_4$-like surface phase. These data demonstrate that the novel zeolite phase formed by the hydrothermal treatment of nickel- and aluminum-containing MFI zeolites has a unique and characteristic catalytic activity in the cracking of n-tetradecane.

EXAMPLE 12

This example describes the comparison testing of the MFI and Ni-MFI samples using the tetradecane cracking reaction.

Samples from Comparison Examples 6 and 7 were tested using the tetradecane cracking reaction as described in Example 11. The results for these samples as well as for samples from Examples 6 and 7 are shown in Table 3.

TABLE 3

Tetradecane Cracking Selectivities at 55% Conversion

| Sample | MFI | | Ni-MFI-5 | |
|---|---|---|---|---|
| Example # | CE6 | CE7 | E6 | E7 |
| Pretreatment | Stm. 550° | Stm. 750° | Stm. 550° | Stm. 750° |
| Loading gms | 0.021 | 0.210 | 0.013 | 0.110 |
| WHSV, hr$^{-1}$ | 218 | 22 | 352 | 42 |
| Product Yields, wt. % | | | | |
| Gas (C1–C4) | 35.4 | 37.8 | 33.9 | 32.0 |
| Gasoline (C5–C12) | 19.2 | 17.1 | 20.1 | 22.2 |
| Coke | 0.003 | 0.032 | 0.012 | 0.051 |
| C5–C12 Gasoline Composition, wt. % | | | | |
| n-Paraffins | 46.9 | 39.2 | 21.7 | 17.0 |
| i-Paraffins | 2.9 | 4.4 | 2.0 | 2.0 |
| Olefins | 47.6 | 52.2 | 40.7 | 48.7 |
| Naphthenes | 1.4 | 1.0 | 1.0 | 2.4 |
| Aromatics | 1.3 | 3.0 | 34.7 | 30.1 |
| Calculated Octane For C5–C12 Gasoline | | | | |
| RON | 70.4 | 77.2 | 89.3 | 90.3 |
| MON | 60.2 | 65.6 | 75.9 | 76.2 |

The results demonstrate that the Ni-MFI samples are more active for tetradecane cracking than the MFI catalysts. For example, the paraffin cracking activity is increased over the catalyst with similar pretreatment but without Ni, by at least a 10% relative reduction in the amount of catalyst necessary to effect 55% conversion of n-tetradecane at 500° C. and atmospheric pressure for weight hourly space velocities within the range of 5 to 1000 hr$^{-1}$.

Furthermore, the Ni-MFI catalysts have a much greater selectivity towards aromatics and a much lower selectivity towards paraffins than the MFI catalysts. For example, the aromatic fraction in the C5 to C12 gasoline range product is increased over the catalyst with similar pretreatment but without Ni, by at least a 100 wt % relative increase in the aromatic C5 to C12 fraction at 55% conversion of n-tetradecane at 500° C. and atmospheric pressure for weight hourly space velocities within the range of 5 to 1000 hr$^{-1}$.

As a result, the calculated octane numbers of the gasoline range product produced with the Ni-MFI catalysts are significantly greater than those for products produced with the MFI catalysts. For example, the calculated octane numbers of the C5 to C12 gasoline range products are increased over the catalyst with similar pretreatment but without Ni, by at least a +0.5 increase in motor octane number and a +1.0 increase in research octane number at 55% conversion of n-tetradecane at 500° C. and atmospheric pressure for weight hourly space velocities within the range of 5 to 1000 hr$^{-1}$.

In addition the yield of C5 to C12 gasoline range products is increased over the catalyst with similar pretreatment but without Ni, by at least a 3 wt % relative increase in the yield of C5 to C12 products at 55% conversion of n-tetradecane at 500° C. and atmospheric pressure for weight hourly space velocities within the range of 5 to 1000 hr$^{-1}$.

Figure 5:
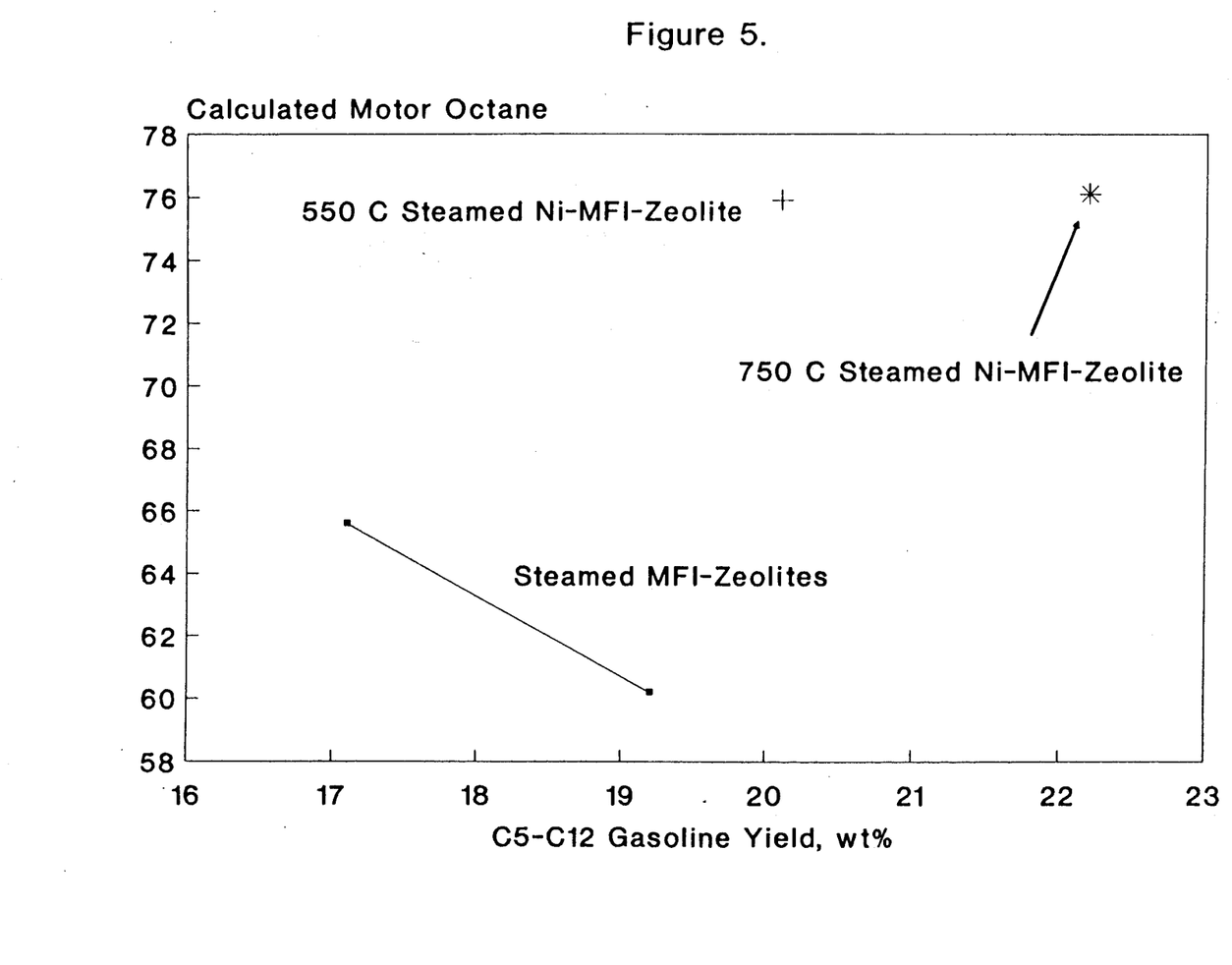
FIG. 5 is a plot of the calculated motor octane as a function of wt % gasoline yield for steamed MFI zeolites from comparison Examples 6 and 7 and for steamed Ni-MFI zeolites from Examples 6 and 7 determined by n-tetradecane cracking at 500° C. and 55% conversion.

In FIG. 5 is shown a plot of motor octane vs gasoline yield which demonstrates that the severely steamed Ni-MFI catalyst from Example 7 produces the highest octane product for a given gasoline yield of all the catalysts tested. These results demonstrate the utility of the Ni-MFI materials, especially Ni-MFI materials that have undergone severe hydrothermal pretreatments, for producing high octane product during the cracking of n-paraffins.

EXAMPLE 13

This example describes the preparation of an MEL-type zeolite.

An MEL-type zeolite which had been converted into its protic form was received from the Georgia Tech Research Company. Chemical analysis of the product indicated that on an anhydrous basis the product contained 95.3 wt % SiO$_2$, 4.72 wt % Al$_2$O$_3$ and 0.022 wt % Na$_2$O.

EXAMPLE 14

This example describes the preparation of a catalytically active Ni-MEL zeolite hydrothermally treated at 750° C.

Five gms of the product from Example 13 was impregnated with a solution of 0.62 gms Ni(NO$_3$)$_2$.6H$_2$O in 2 ml H$_2$O. The product was dried at 100° C., and then ramped in air at 2° C./min to 550° C. and was held at that temperature for 1 hr. It was then cooled to ambient temperature. The product contained 2.56 wt % Ni on an anhydrous basis. This product was then meshed −14+25, and was then ramped under flowing nitrogen to 750° C. over a period of 1 hr. It was then held at that temperature for 4 hours while a mixture of 95% water/5% nitrogen was passed over the zeolite at atmospheric temperature. The product was then cooled slowly to ambient temperature.

COMPARISON EXAMPLE 14

This example describes the preparation of a catalytically active MEL zeolite hydrothermally treated at 750° C.

Six gms of the product from Example 13 was meshed −14+25, was ramped under flowing nitrogen to 750° C. over a period of 1 hr. It was then held at that temperature for 4 hours while a mixture of 95% water/5% nitrogen was passed over the zeolite at atmospheric temperature. The product was then cooled slowly to ambient temperature.

EXAMPLE 15

This example describes the comparison testing of the MEL and Ni-MEL zeolites using the tetradecane-cracking reaction.

Samples from Example 14 and Comparison Example 14 were evaluated using the tetradecane cracking test as described in Example 11. The results of these tests are shown in Table 4.

TABLE 4

| Tetradecane Cracking Selectivities at 55% Conversion | | |
|---|---|---|
| Sample | MEL | Ni-MEL |
| Example | Comparison Example 14 | Example 14 |
| Pretreatment | Stm. 750° | Stm. 750° |
| Loading gms | 0.204 | 0.175 |
| WHSV, hr$^{-1}$ | 22 | 26 |
| Product Yields, wt. % | | |
| Gas (C1–C4) | 37.0 | 34.4 |
| Gasoline (C5–C12) | 17.2 | 19.5 |
| Coke | 0.066 | 0.989 |
| C5–C12 Gasoline Composition, wt. % | | |
| n-Paraffins | 31.9 | 26.3 |
| i-Paraffins | 7.3 | 3.1 |
| Olefins | 56.3 | 47.4 |
| Naphthenes | 1.4 | 1.5 |
| Aromatics | 3.1 | 21.6 |
| Calculated Octane for C5–C12 Gasoline | | |
| RON | 83.9 | 85.2 |
| MON | 71.0 | 72.1 |

The results demonstrate that the Ni-MEL sample is more active for tetradecane cracking than the MEL zeolite. Furthermore, the Ni-MEL zeolite has a much greater selectivity towards aromatics and a much lower selectivity towards paraffins than the MEL zeolite. As a result, the calculated octane numbers of the gasoline range product produced with the Ni-MEL zeolite is significantly greater than those for the products produced with the MEL zeolite. These results demonstrate the utility of the Ni-MEL material that has undergone severe hydrothermal pretreatment for producing high octane product during the cracking of n-paraffins.

It is understood that the foregoing detailed description is given merely by way of illustration and that many variations may be made therein without departing from the spirit of this invention.

What is claimed is:

1. A zeolite catalyst for improved hydrocarbon cracking comprising a crystalline aluminosilicate MFI or MEL zeolite in its protic form having a SiO$_2$/Al$_2$O$_3$ ratio greater than 5, containing nickel in an amount of from about 0.1 wt % Ni to about 10 wt % of the total weight of the zeolite and having been subjected to severe hydrothermal treatment under controlled conditions of temperature, time or steam partial pressure and at a temperature of at least 500° C. so as a) to effect an increase in the relative surface concentrations of nickel and aluminum in the zeolite;

b) to transform the Ni 2p x-ray photoelectron spectral feature from one with a line shape and binding energy similar to those of NiO to one with a line shape and binding energy similar to those of NiAl$_2$O$_4$; and c) to effect in the cracking of tetradecane at 500° C., atmospheric pressure and 55% conversion an n-paraffin selectivity in the C5–C12 fraction of the products which is less than 29 wt. %.

2. A catalyst according to claim 1, wherein said zeolite is an MFI zeolite.

3. A catalyst according to claim 1, wherein said zeolite is an MEL zeolite.

4. A method for making a zeolite catalyst for improved hydrocarbon conversion wherein said zeolite comprises a crystalline aluminosilicate MFI or MEL zeolite in its ammonium or protic form, having a SiO$_2$/Al$_2$O$_3$ ratio greater than 5, and containing nickel in an amount of from about 0.1 wt % Ni to about 10 wt % of the total weight of the zeolite comprising subjecting said zeolite catalyst to severe hydrothermal treatment under controlled conditions of temperature, time or steam partial pressure and at a temperature of at least 500° C. so as a) to effect an increase in the relative surface concentrations of nickel and aluminum in the zeolite;

b) to transform the Ni 2p x-ray photoelectron spectral feature from one with a line shape and binding energy similar to those of NiO to one with a line shape and binding energy similar to those of NiAl$_2$O$_4$; and c) to effect in the cracking of tetradecane at 500° C., atmospheric pressure and 55% conversion an n-paraffin selectivity in the C5-C12 fraction of the products which is less than 29 wt. %.

5. A method according to claim 4, wherein a thermal treatment is given at a temperature between about 500° C. and 1000° C.

6. A method according to claim 5, wherein the temperature is between about 650° C. and 800° C.

7. A method according to claim 4, wherein a hydrothermal treatment is given with a steam partial pressure of from about 1% to about 100%, at a temperature of between about 400° C. and 900° C. and at a pressure of between 0.01 and 1.0 MPa.

8. A method according to claim 7, wherein the temperature is between about 550° C. and 800° C.

9. A method according to claim 4, wherein said zeolite is an MEL zeolite.

10. A method according to claim 4, wherein said zeolite is an MFI zeolite.

11. A method according to claim 4, wherein said zeolite catalyst contains Ni in an amount of from about 0.1 wt % Ni to about 10 wt % of the total weight of the zeolite.

12. A method according to claim 11, wherein the Ni is in an amount of from about 0.3 wt % to about 5 wt %.

* * * * *

UNITED STATES PATENT AND TRADEMARK OFFICE
CERTIFICATE OF CORRECTION

PATENT NO. : 5,236,880
DATED : August 17, 1993
INVENTOR(S) : David M. Chapman

It is certified that error appears in the above-indentified patent and that said Letters Patent is hereby corrected as shown below:

Claim 1, column 14, line 44, after "protic" insert ---(acidic)---.

Signed and Sealed this

Twenty-ninth Day of March, 1994

Attest:

BRUCE LEHMAN

*Attesting Officer*   *Commissioner of Patents and Trademarks*